(12) United States Patent
Kimes

(10) Patent No.: US 10,821,823 B2
(45) Date of Patent: Nov. 3, 2020

(54) POWERTRAIN ASSEMBLY AND METHOD OF USING SAME

(71) Applicant: Sigma Powertrain, Inc., Canton, MI (US)

(72) Inventor: John Kimes, Wayne, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 16 days.

(21) Appl. No.: 16/253,144

(22) Filed: Jan. 21, 2019

(65) Prior Publication Data

US 2019/0225073 A1    Jul. 25, 2019

Related U.S. Application Data

(60) Provisional application No. 62/619,991, filed on Jan. 22, 2018.

(51) Int. Cl.
| | |
|---|---|
| *B60K 6/48* | (2007.10) |
| *F16H 3/66* | (2006.01) |
| *B60K 6/365* | (2007.10) |
| *B60W 10/02* | (2006.01) |
| *B60W 10/08* | (2006.01) |

(Continued)

(52) U.S. Cl.
CPC .............. *B60K 6/48* (2013.01); *B60K 6/365* (2013.01); *B60W 10/02* (2013.01); *B60W 10/08* (2013.01); *B60W 10/115* (2013.01); *B60W 20/15* (2016.01); *B60W 20/40* (2013.01); *B60W 30/19* (2013.01); *F16H 3/663* (2013.01); *B60K 2006/4825* (2013.01);

(Continued)

(58) Field of Classification Search
CPC ......... B60K 6/48; B60K 6/365; B60W 10/02; B60W 10/08
See application file for complete search history.

(56) References Cited

U.S. PATENT DOCUMENTS

| | | | |
|---|---|---|---|
| 7,572,201 B2* | 8/2009 | Supina | ................... B60L 50/16 475/5 |
| 7,695,387 B2* | 4/2010 | Oba | ....................... B60K 6/365 475/290 |

(Continued)

FOREIGN PATENT DOCUMENTS

WO     2017049049 A1    3/2017

OTHER PUBLICATIONS

International Search Report, International Application No. PCT/US2019/14432, dated Apr. 9, 2019.

*Primary Examiner* — Derek D Knight
(74) *Attorney, Agent, or Firm* — Simonelli IP, PLLC

(57) ABSTRACT

A powertrain assembly for a vehicle includes a first motor and a second motor. A power split assembly, having an output power shaft, is connected to both the first and second motors to the power output shaft. The power split assembly selectively receives power output from the first and second motors, wherein the power split assembly defines a plurality of modes of operation to provide torque to the output power shaft. The powertrain assembly also includes a bypass power shaft operatively connected between the second motor and the output power shaft, such that the second motor provides torque to the output power shaft using the bypass power shaft to reduce torque interruptions created by the power split assembly during changes in the plurality of modes of operation.

9 Claims, 16 Drawing Sheets

(51) Int. Cl.
*B60W 10/115* (2012.01)
*B60W 20/15* (2016.01)
*B60W 30/19* (2012.01)
*B60W 20/40* (2016.01)

(52) U.S. Cl.
CPC . *B60W 2710/021* (2013.01); *B60W 2710/083* (2013.01); *B60W 2710/1005* (2013.01); *B60Y 2200/92* (2013.01)

(56) References Cited

U.S. PATENT DOCUMENTS

| | | | |
|---|---|---|---|
| 9,186,977 B2 * | 11/2015 | Kimes | ............ B60K 6/543 |
| 9,933,049 B2 | 4/2018 | Kimes | |
| 2013/0296115 A1 | 11/2013 | Grutter | |
| 2014/0350764 A1 | 11/2014 | Arai | |
| 2016/0082821 A1 | 3/2016 | Mueller et al. | |

* cited by examiner

POWERTRAIN ASSEMBLY AND METHOD OF USING SAME

BACKGROUND ART

1. Field of the Invention

The invention relates to a powertrain assembly for a vehicle movable using electric motive power. More particularly, the invention relates to a powertrain assembly for a vehicle movable using electric motive power in a manner to reduce torque interruptions.

2. Description of the Related Art

All electric, hybrid electric, and plug-in hybrid electric vehicles (collectively referred to as EVs) have a powertrain to transfer power from various power generators to the driven wheels of the vehicle. Traditional transmissions utilize hydraulics and friction to operate. These two performance principles work well in the traditional transmission when powered by an internal combustion engine. The physics of these traditional transmission result in extreme amounts of energy waste preventing the EVs from reaching ranges that make them a commercially viable option to the vehicles powered solely by internal combustion engines.

SUMMARY OF THE INVENTION

A powertrain assembly for a vehicle includes a first motor having a first output and a second motor having a second output. A summing subassembly is connected to the first and second motors. The summing subassembly selectively receives power output from the first motor and the second motor. The summing subassembly defines a plurality of modes of operation to provide torque from said first and second outputs. A gearset is connected to the summing subassembly to receive the torque therefrom. The gearset has a plurality of gears and defining an output power shaft, whereby the output power shaft outputs a final torque output based on the gear in operation. The powertrain assembly also includes a bypass power shaft operatively connected between the second motor and the output power shaft, such that the second motor provides torque to the output power shaft using said bypass power shaft to reduce torque interruptions created by the summing subassembly during changes in the plurality of modes of operation.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
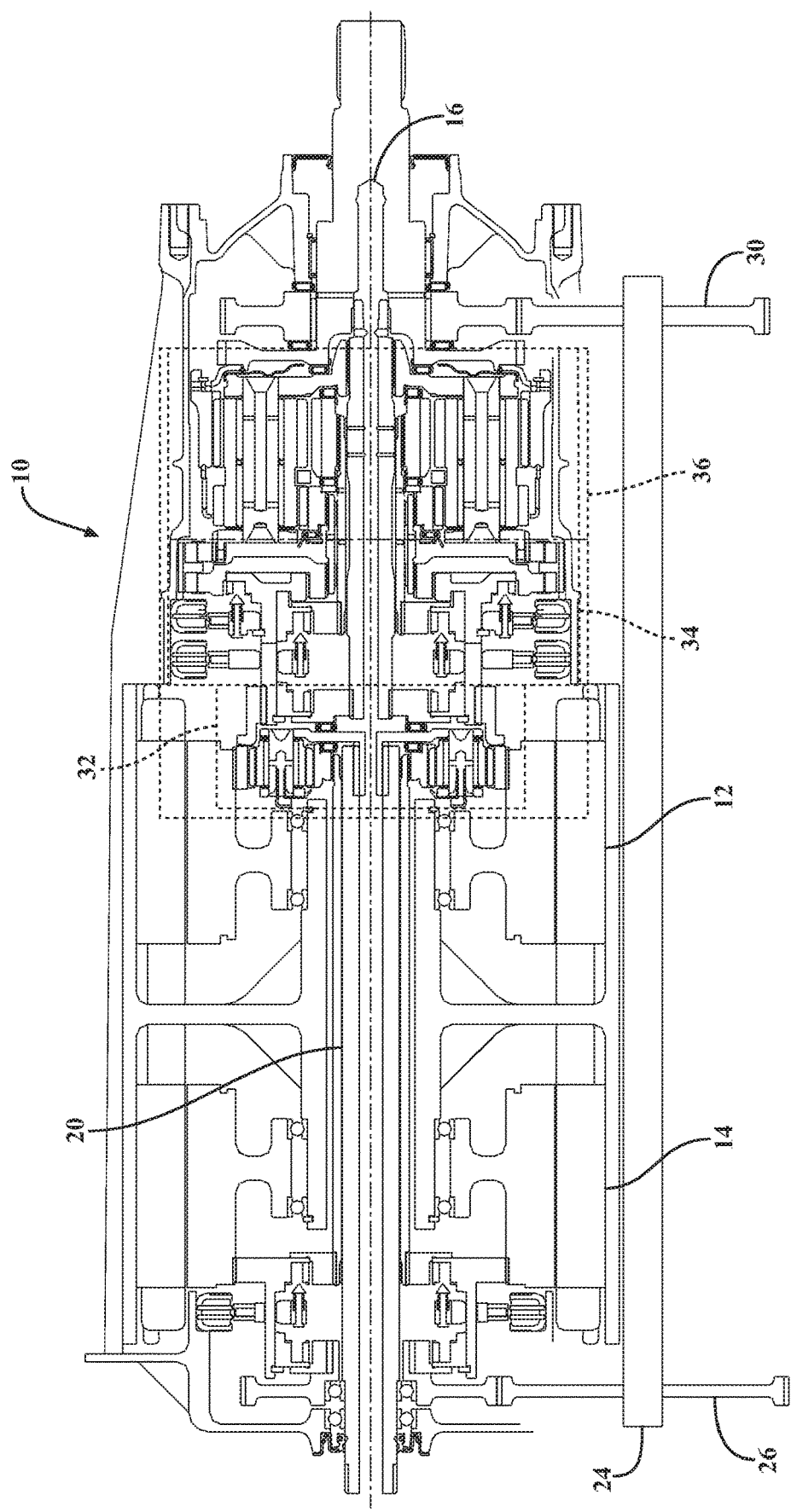
FIG. 1 is a cross-sectional side view of a preferred embodiment of the invention.

Referring to FIG. 1, a cross-sectional view of a powertrain according to one embodiment of the invention is generally shown at 10. This high-level rendering illustrates the connections between the various components of the powertrain 10. The motors shown are either stators and rotors for the 150 KW REMY 250 HVH e-motors. The entire length of the transmission is approximately 744 mm. It should be appreciated by those skilled in the art that other motors may be used, which may affect the approximate length of the powertrain 10.

The powertrain 10 includes a first motor 12 and a second motor 14. Both of the first 12 and second 14 motors are electric. These motors 12, 14 operate independently of each other and in concert with each other, depending on the mode in which the powertrain 10 is operating.

When operating the powertrain 10 in mid-range vehicle speeds, the powertrain 10 is in Speed Ratio Mode (SRM). In SRM, the speeds of the first 12 and second 14 motors are a fixed ratio relative to output speed. The first motor 12 has a ratio A to output and the second motor 14 has a ratio B to output. So, in SRM for a given vehicle speed, the speed of the motors 12, 14 are fixed relative to their corresponding ratios.

In SRM, the first motor 12 can be powered independently of second motor 14. The three operating states of the powertrain 10 in SRM include power the first motor 12 only; power the second motor 14 only; and power the two motors 12, 14 together at the same time.

While the speed of the motors 12, 14 relative to output is fixed via a ratio, the torques in each motor 12, 14 can vary from zero to maximum torque. The output torque is determined by this following formula $$T_{out} = T_A \frac{(X+Y)}{Y} + T_B\left(\frac{Z}{Y}\right) \qquad \text{Equation 1}$$

where:

$T_A$=torque of the first motor 12;
$T_B$=torque of the second motor 14;
$((X+Y)/Y)$ is the ratio for the first motor 12; and
$(Z/Y)$ is the ratio for the second motor 14.

The variables X, Y, and Z are determined by the sun and ring gear tooth counts in a Simpson gearset.

The powertrain 10 includes an output shaft 16 that drives the driven wheels (not shown) of the motor vehicle (not shown). The powertrain 10 includes a transmission, generally indicated at 18. The transmission 18 is centered about a central shaft 20, which may be coaxial with the output shaft 16. The powertrain 10 may also include an internal combustion engine 22 (shown in FIG. 2 et seq.) that may also supply torque to the transmission 18 at designated times to assist in driving the driven wheels of the motor vehicle.

The powertrain assembly 10 includes a bypass power shaft 24 that operatively extends between the second motor 14 and the output shaft 16. The bypass power shaft 24 includes a first set of gears 26 and a second set of gears 30 at either end of the bypass power shaft 24 to allow the bypass power shaft 24 to be offset from and parallel to the central shaft 20 and the output shaft 16. The combination of the bypass power shaft 24, the first set of gears 26, and the second set of gears 30 provide a selective, direct link between the second motor 14 and the output shaft 16. The transmission 18 includes a summing subassembly 32, an input clutch module 34 and a gearset subassembly 36. All the summing subassembly 32, the input clutch module 34, the gearset subassembly 36 and the bypass power shaft 24 will be discussed in greater detail subsequently.

Referring to FIGS. 4 through 7, the input clutch module 34 is a compact radial design and is not linear in function. The input clutch module 34 includes an input ring 40. Immediately within the input ring 40 are a first pocket plate 42 and a first notch plate 44 of a fourth clutch 46. A pair of clutch actuators 48, 50 are disposed adjacent the first notch plate 44. Disposed within the clutch actuators 48, 50 are a second notch plate 52 for a third clutch 54 and a second pocket plate 56 used for the third clutch 54 and a fifth clutch 60. Disposed adjacent the second pocket plate 56 is a third notch plate 62 used for the fifth clutch 60 and the sixth clutch 64. Extending over and around the third notch plate 62 is a third pocket plate 66 used for the sixth clutch 64 and a seventh clutch 70. Finally, a fourth notch plate 72 is disposed within the third pocket plate 66 and is used for the seventh clutch 70.

Referring back to FIG. 2, one embodiment of the powertrain assembly 10 is shown in block diagram form. Inputs into the summing subassembly 32 are the first motor 12 and, if included in the powertrain assembly 10, the internal combustion engine 22. The second motor 14 is an indirect input into the summing subassembly 32 through a first clutch 74. The summing subassembly 32 includes a sun gear 76, a planetary gearset 80, and a ring gear 82. The first motor 12 is connected to the ring gear 82. The internal combustion engine 22 is connected to the planetary gearset 80 and the second motor 14 is connected to the sun gear 76 through the first clutch 74. The second motor is also connected to the bypass power shaft 24 through a second clutch 84 and the first set of gears 26.

The primary output of the summing subassembly 32 is received by the input clutch module 34, which includes third 54, fourth 46, fifth 60, sixth 64 and seventh 70 clutches. The output of the input clutch module 34 is the gearset subassembly 36. In the preferred embodiment shown in FIG. 2, the gearset subassembly 36 is a Ravigneaux gearset having a second sun gear 86, a third sun gear 90, a short pinion gear 92, a long pinion gear 94 and a second ring gear 96, configured as is well known in the art.

Figure 2:
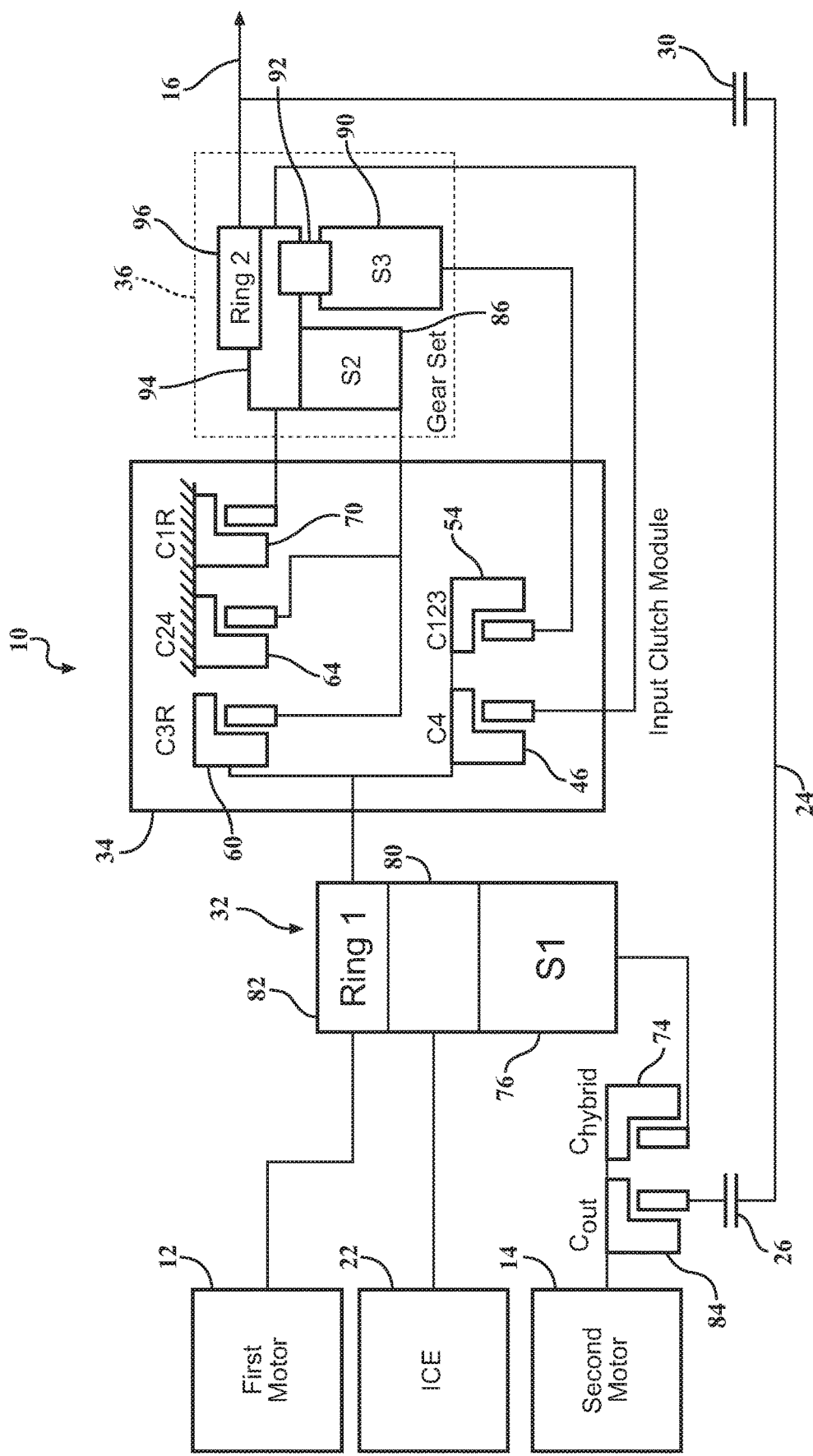
FIG. 2 is a block diagram of the preferred embodiment of FIG. 1.
Figure 3:
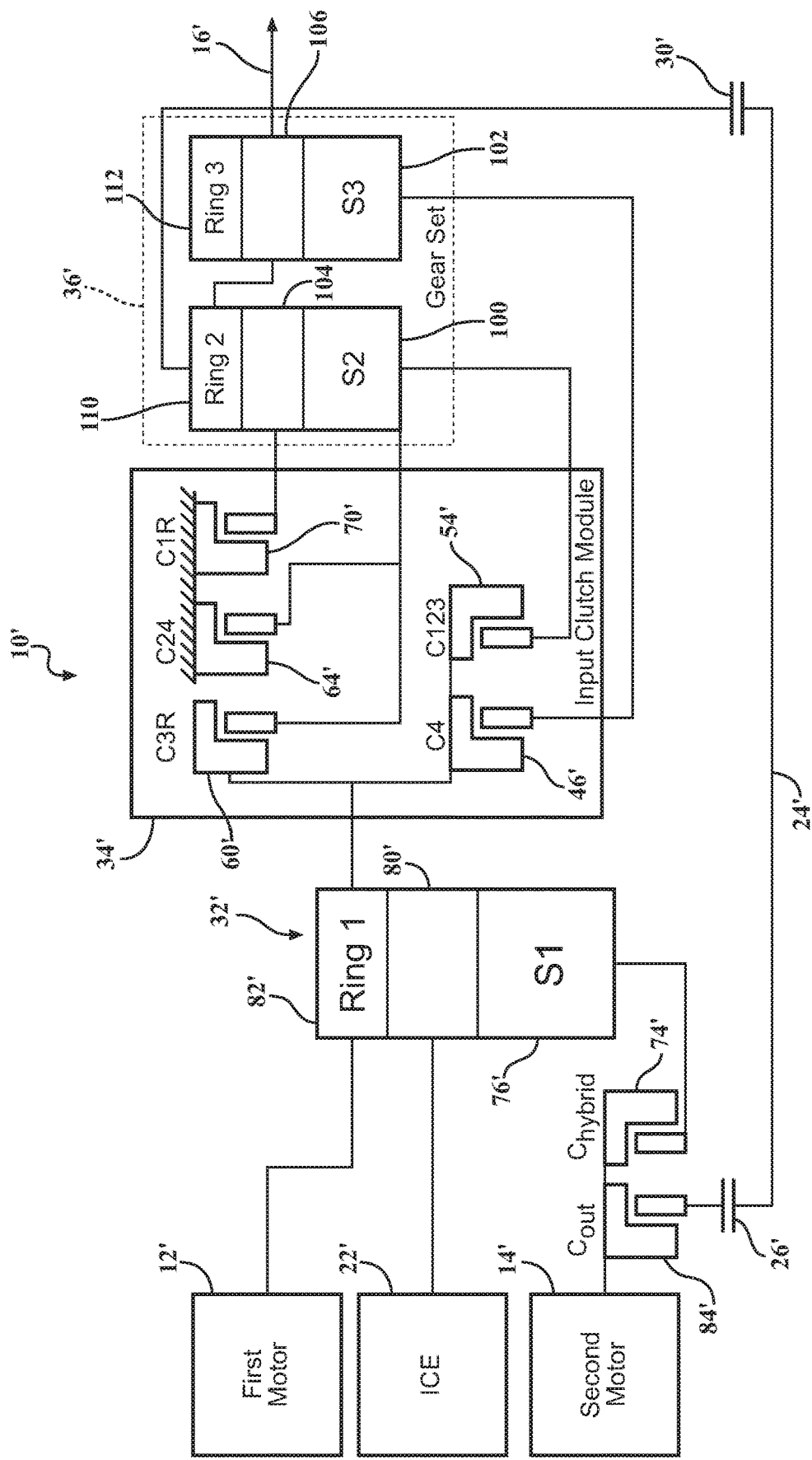
FIG. 3 is a block diagram of an alternative embodiment of the invention.
Figure 4:
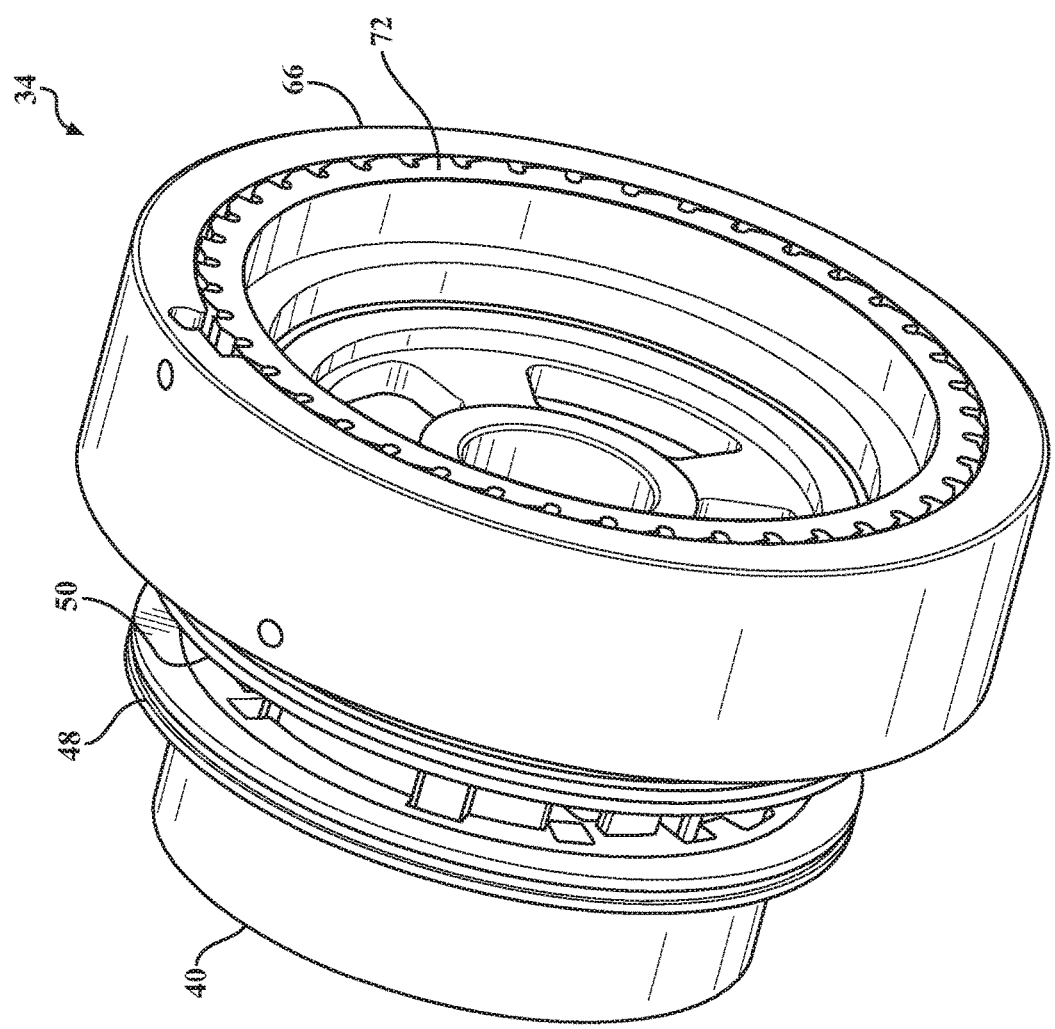
FIG. 4 is a perspective view of a clutch module incorporated into the preferred embodiment.
Figure 6:
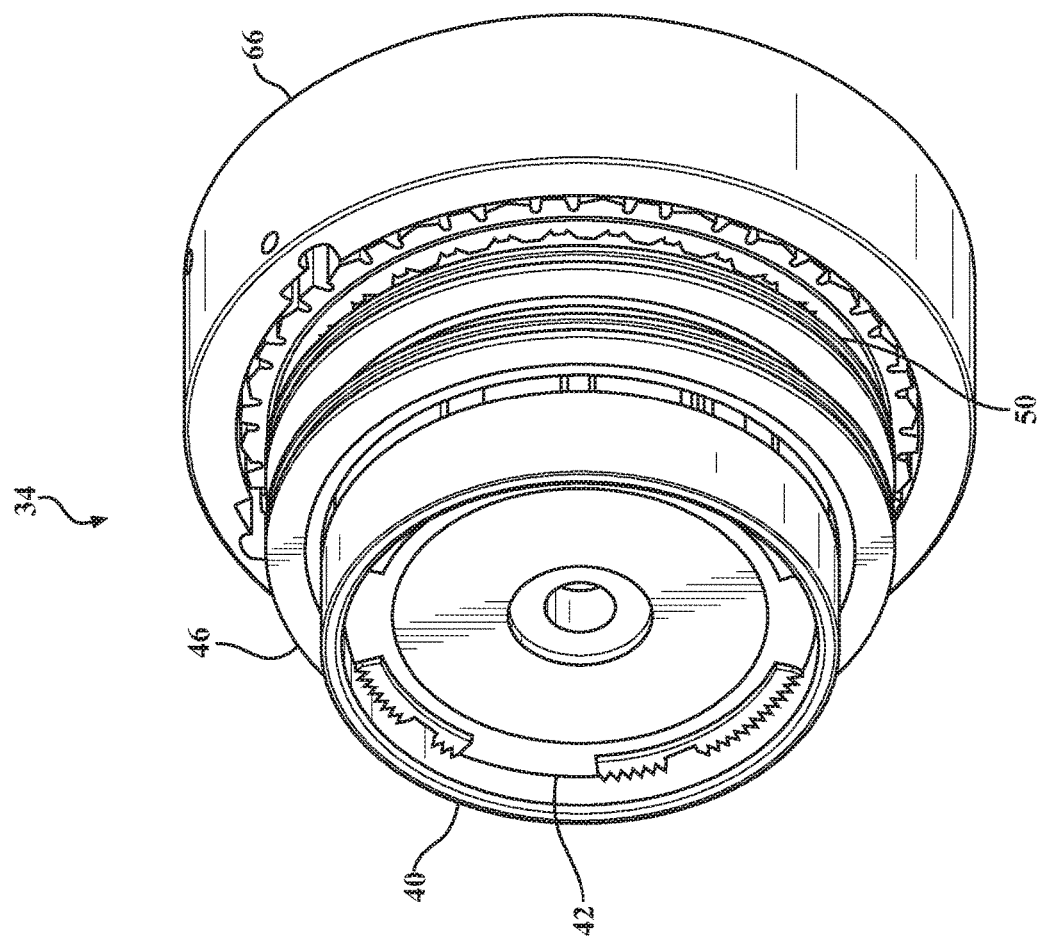
FIG. 6 is a perspective end view of the clutch module of FIG. 4.
Figure 5:
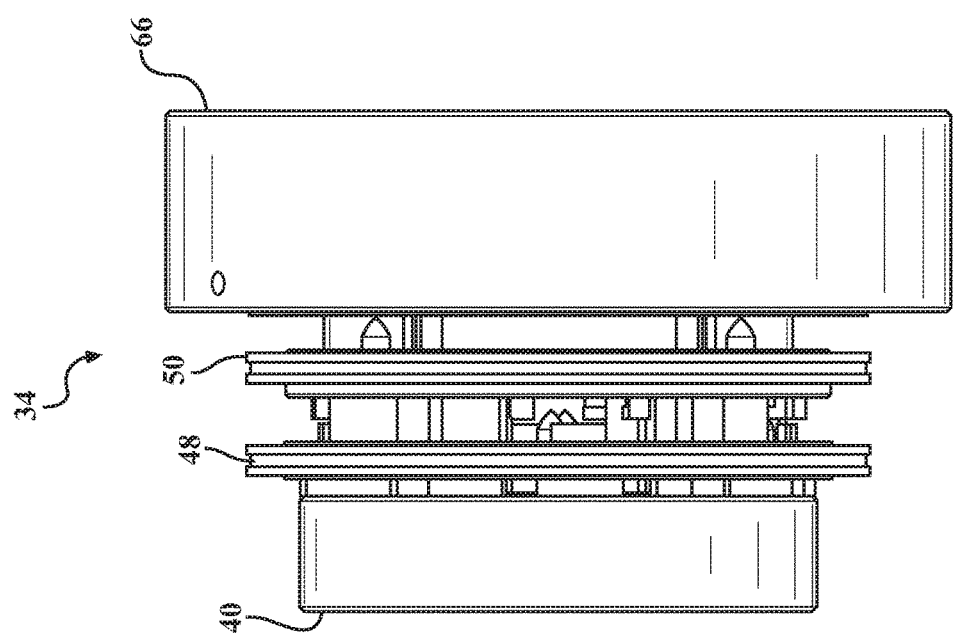
FIG. 5 is a side view of the clutch module of FIG. 4.
Figure 7:
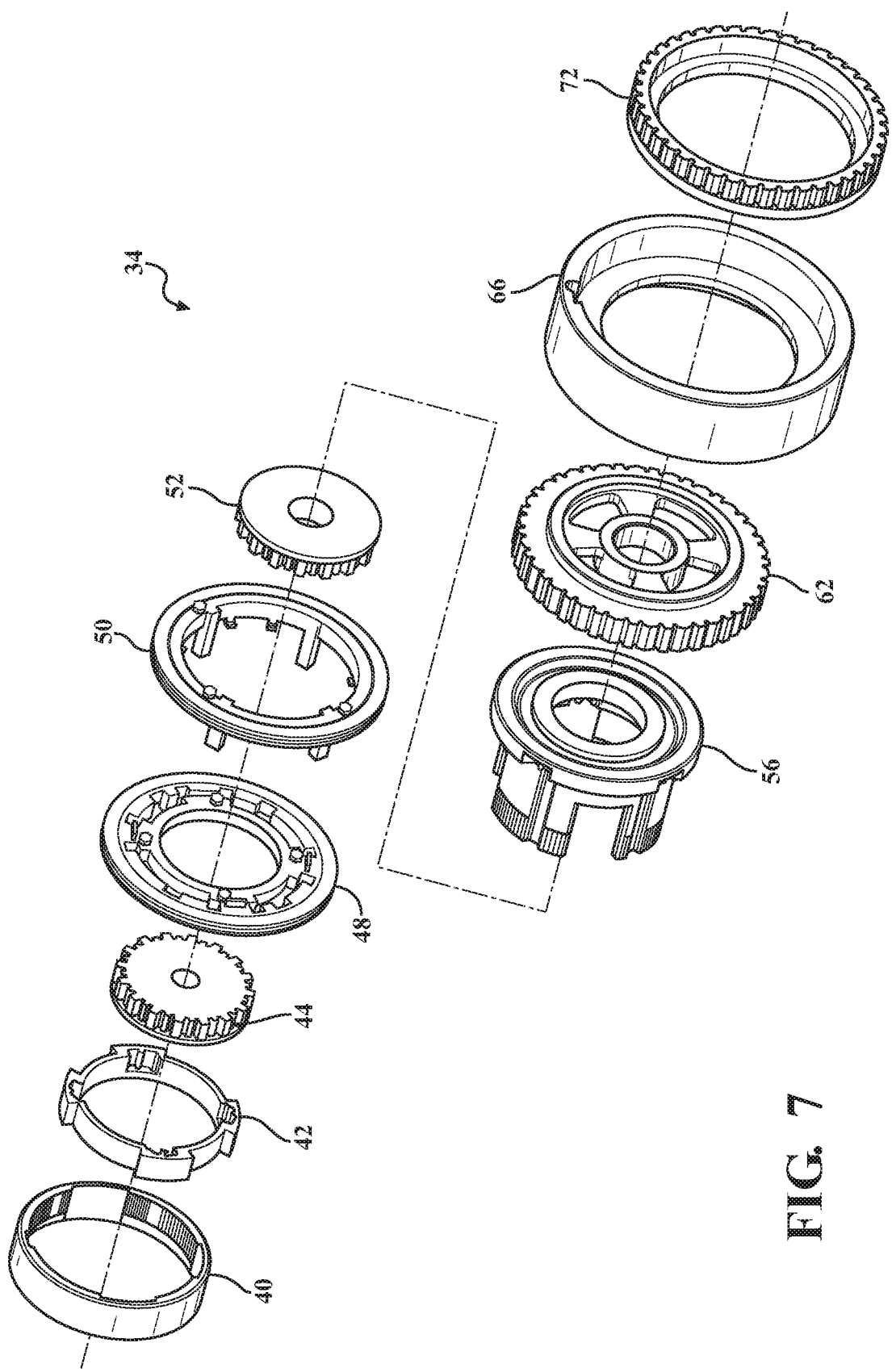
FIG. 7 is an exploded perspective view of the clutch module of FIG. 4.

Referring to FIG. 3, wherein like primed reference numerals represent similar elements as those shown in FIG. 2, an alternative embodiment of the invention is shown at 10'. The configuration of the torque input devices (the first 12' and second 14' motors and the internal combustion engine 22'), the summing subassembly 32', and the input clutch module 34' are all configured identically to the preferred embodiment shown in FIG. 2. The only difference is the gearset subassembly 36', which is not a Ravigneaux gearset but a Simpson gearset. The Simpson gearset 36' includes a second sun gear 100, a third sun gear 102, pinion gears 104, 106, a second ring gear 110 and a third ring gear 112. The components of the Simpson gearset 36' are configured in a standard set up as is well known to those skilled in the art.

Figure 8:
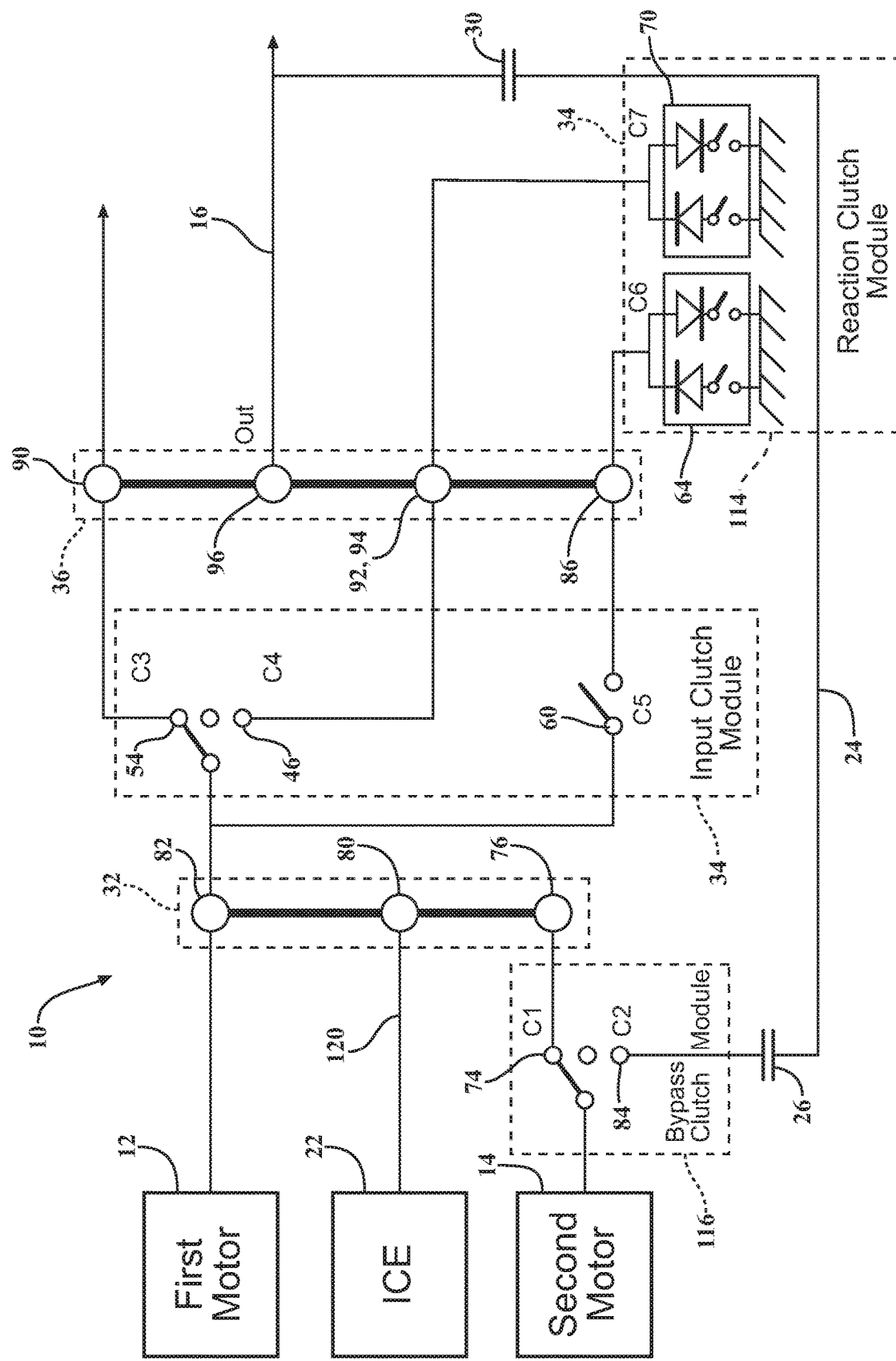
FIG. 8 is a lever diagram showing a drive system for a vehicle at least partially driven by an electrical power source combined with a nomographic chart showing a zero-torque line.
Figure 9:
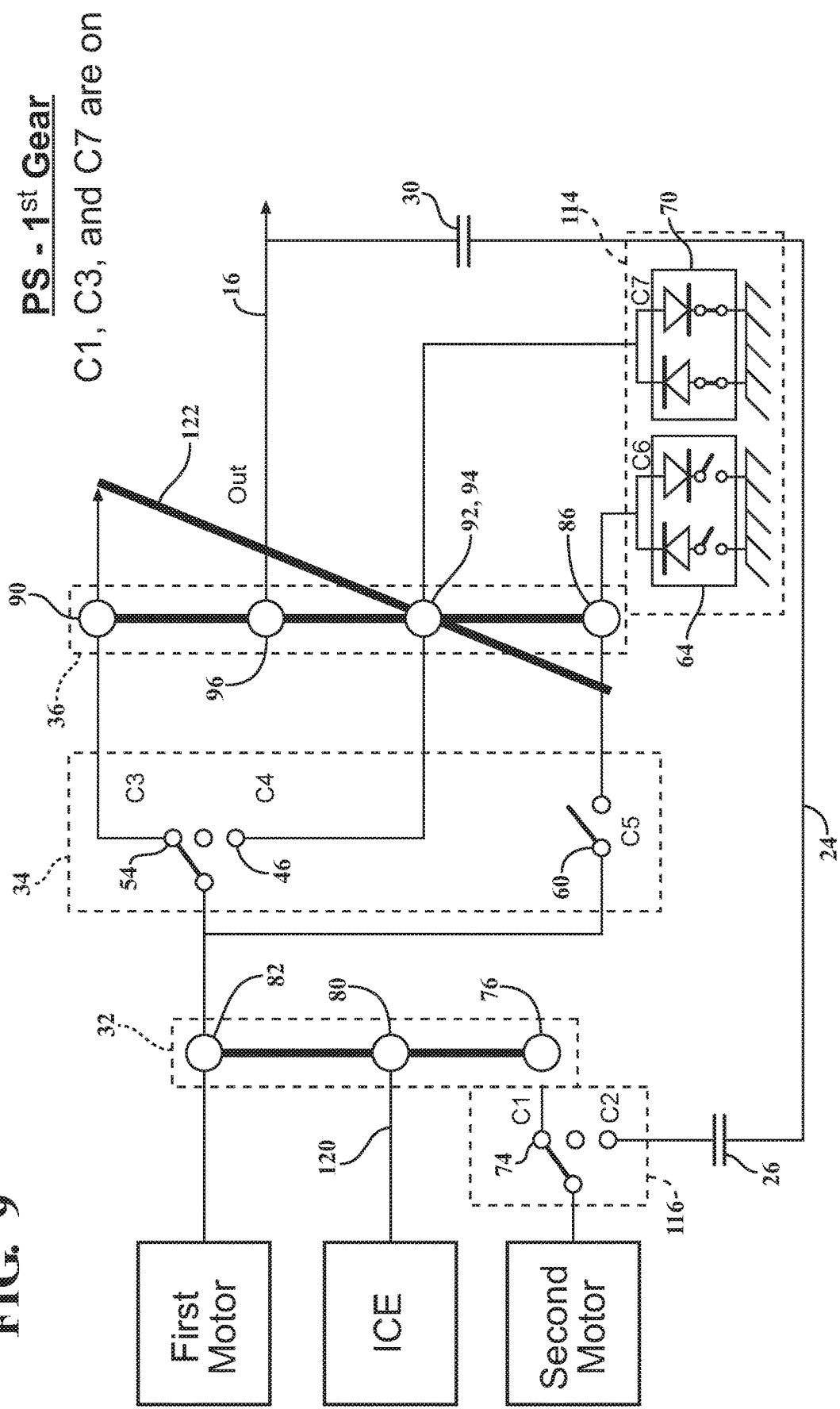
FIGS. 9 through 11 are lever diagrams of the drive system in FIG. 8 sequentially stepping through a power split shift from first to second gears.

Referring to FIGS. 8 through 17, lever diagrams of the preferred embodiment (using the Ravigneaux gearset 36) are shown. Referring specifically to FIG. 8, a lever diagram of the powertrain 10 is generally shown with no torque being input into the powertrain assembly 10. In other words, the powertrain 10 is at rest in FIG. 8. The powertrain 10 includes the input clutch module 34, a reaction clutch module 114, and a bypass clutch module 116. The input clutch module 34 is discussed above. The reaction clutch module 114 includes the sixth 64 and seventh 70 clutches. The bypass clutch module 116 includes the first 74 and second 84 clutches.

The first motor 12 and the internal combustion engine 22 are operatively connected to the third 54, fourth 46, and fifth 60 clutches, whereas the second motor 14 is selectively connected to the third 54, fourth 46 and fifth 60 clutches in the input clutch module 34. The first 74 and second 84 clutches of the bypass clutch module 116 determine when the second motor 14 is connected to the input clutch module 34. Operation of the bypass clutch module 116 will be discussed in greater detail subsequently.

The sixth 64 and seventh 70 clutches of the reaction clutch module 114 are dual one-way clutches that will prevent rotation or allow rotation and one or the other direction depending on the state in which each of the sixth 64 and seventh 70 clutches exist. The sixth dual one-way clutch 64 is connected between ground and the fifth clutch 60 of the input clutch module 34. The seventh clutch 70 of the reaction clutch module 114 is connected between ground and the fourth clutch 46 of the input clutch module 34.

For clarity, it is noted that the second 84, fourth 46, fifth 60, sixth 64 and seventh 70 clutches are all shown in their open state in FIG. 2, whereas the remaining two clutches 74, 54 are closed.

Referring to FIGS. 9 through 12, a sequential shift from first to second gears in the power split mode is graphically illustrated. Beginning with FIG. 9, the powertrain 10 is in first gear with a positive output through output shaft 16 as graphically illustrated by a lever line 122. At this point, the first 74, third 54 and seventh 70 clutches are on and the second 84, fourth 46, fifth 60 and sixth 64 clutches are off.

Figure 10:
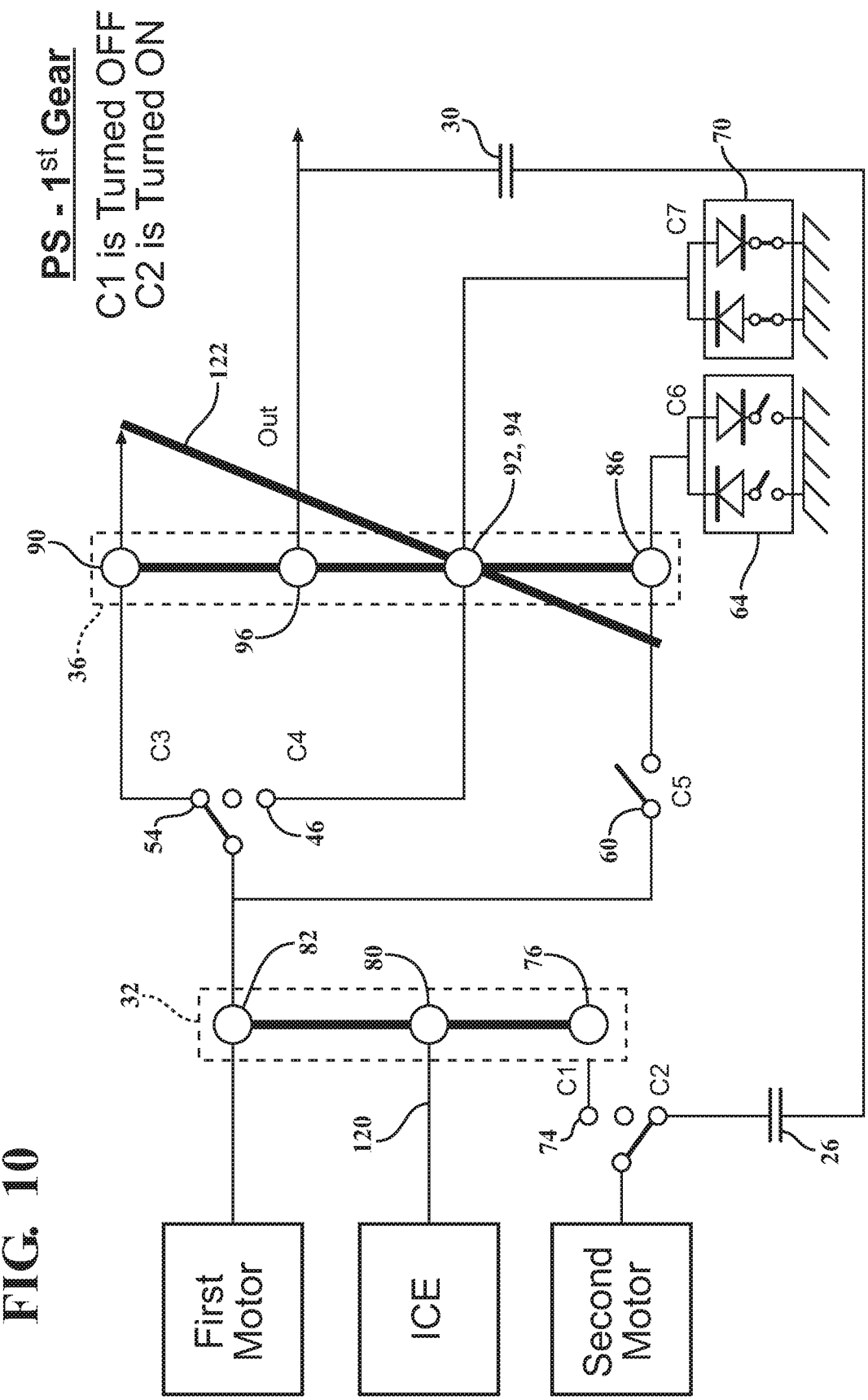

Referring to FIG. 10, in order to shift from first gear to second gear in the power split mode, the second motor 14 is disconnected from the first sun gear 76. Through the two sets of gears 26, 30 and the bypass power shaft 24, the second motor 14 is connected to the output shaft 16. By switching the second motor 14 to directly drive the output shaft 16, torque is maintained on the output shaft 16 while the first motor 12 is used to shift from first gear to second gear. In the embodiment shown in the Figures, the torque demand on the internal combustion engine 22 drops to zero.

Figure 11:
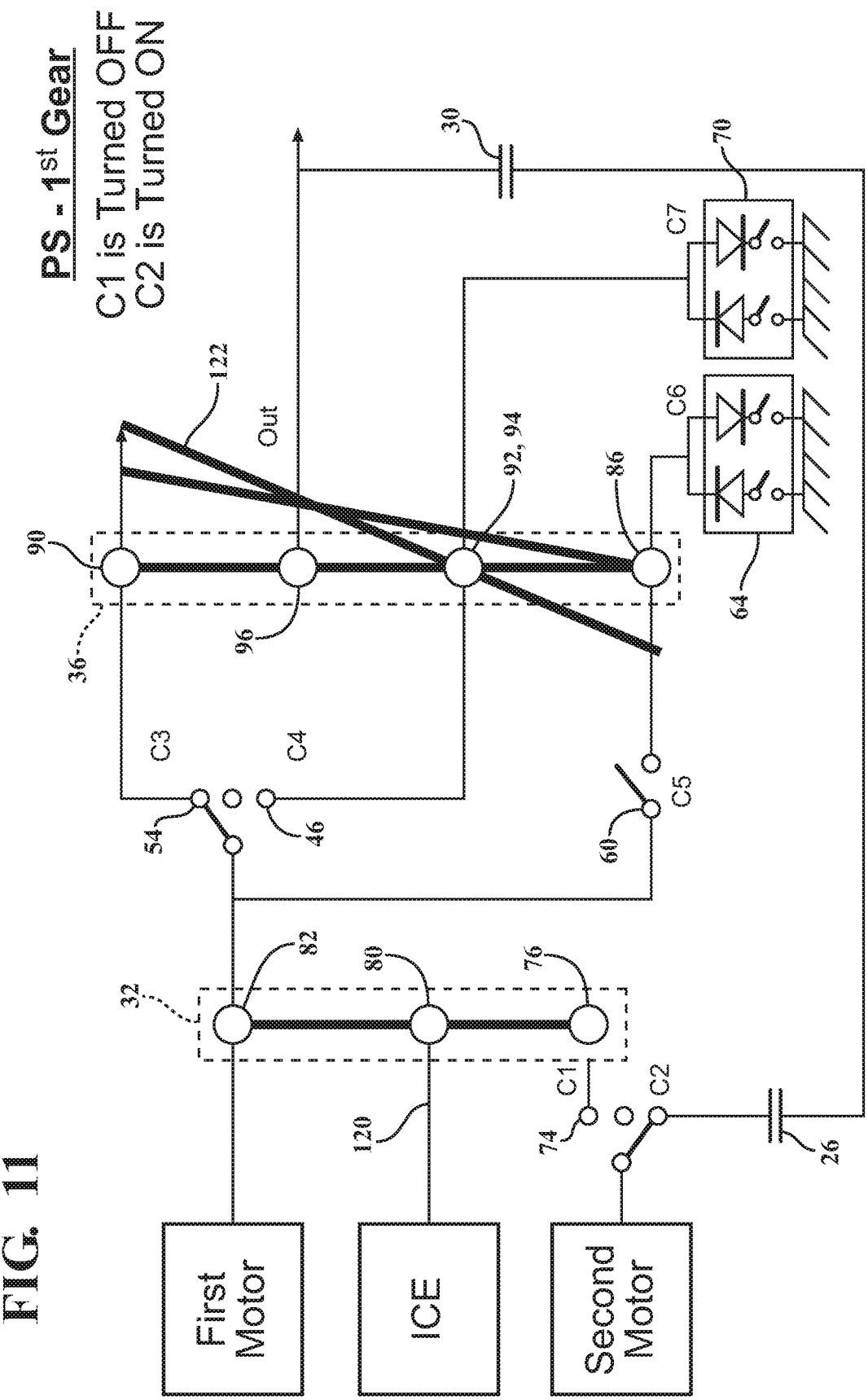

Referring to FIG. 11, the second motor 14 is driving the output shaft 16. A torque hand-off occurs between the first 12 and second 14 motors. Once the torque is completely transferred to the second motor 14, the seventh clutch 70 in the reaction clutch module 114 is turned off. The first motor 12 synchronizes the first sun gear 76 with ground (zero speed). Once the first sun gear 76 is stopped, the sixth clutch 64 in the reaction clutch module 114 is turned on. Once the sixth clutch 64 is turned on, a torque hand-off from the second motor 14 to the first motor 12 can occur.

Figure 12:
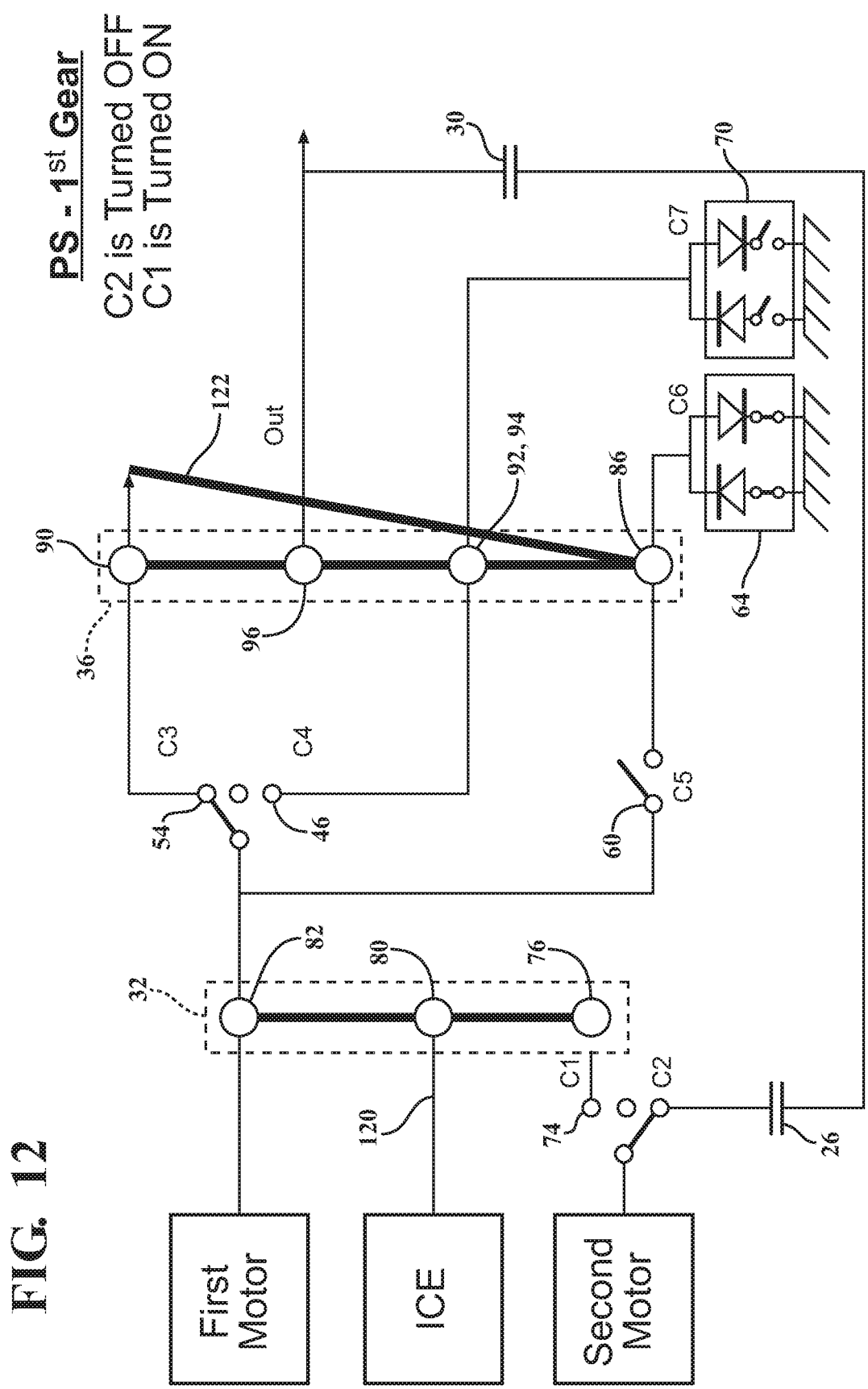
FIGS. 12 through 17 are lever diagrams showing the torque line representing the various gear ratios and modes of operation in which the powertrain assembly may be operated.

Referring to FIG. 12, once the sixth clutch 64 is turned on, the second motor 14 re-enters the power split mode by turning off the second clutch 84 and turning on the first clutch 74, both in the bypass clutch module 116. With the first clutch 74 on, the second motor 14 is synchronized with the first sun gear 76. Throttle demand is no longer ignored and torque on the internal combustion engine 22 and the second motor 14 matches the demand on the output shaft 16. Thus, the powertrain 10 re-enters power split mode in the second gear ratio.

Figure 13:
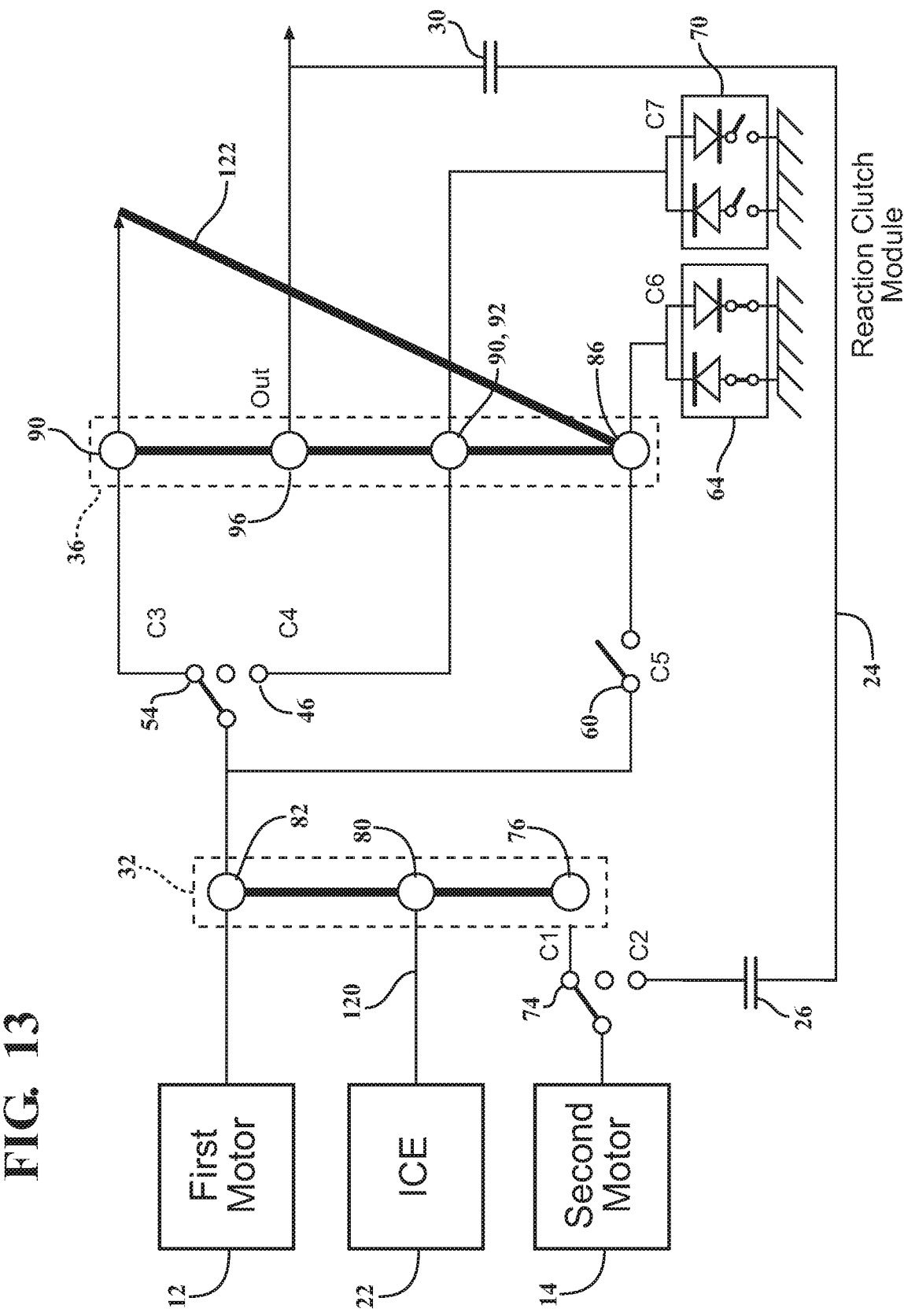
Figure 14:
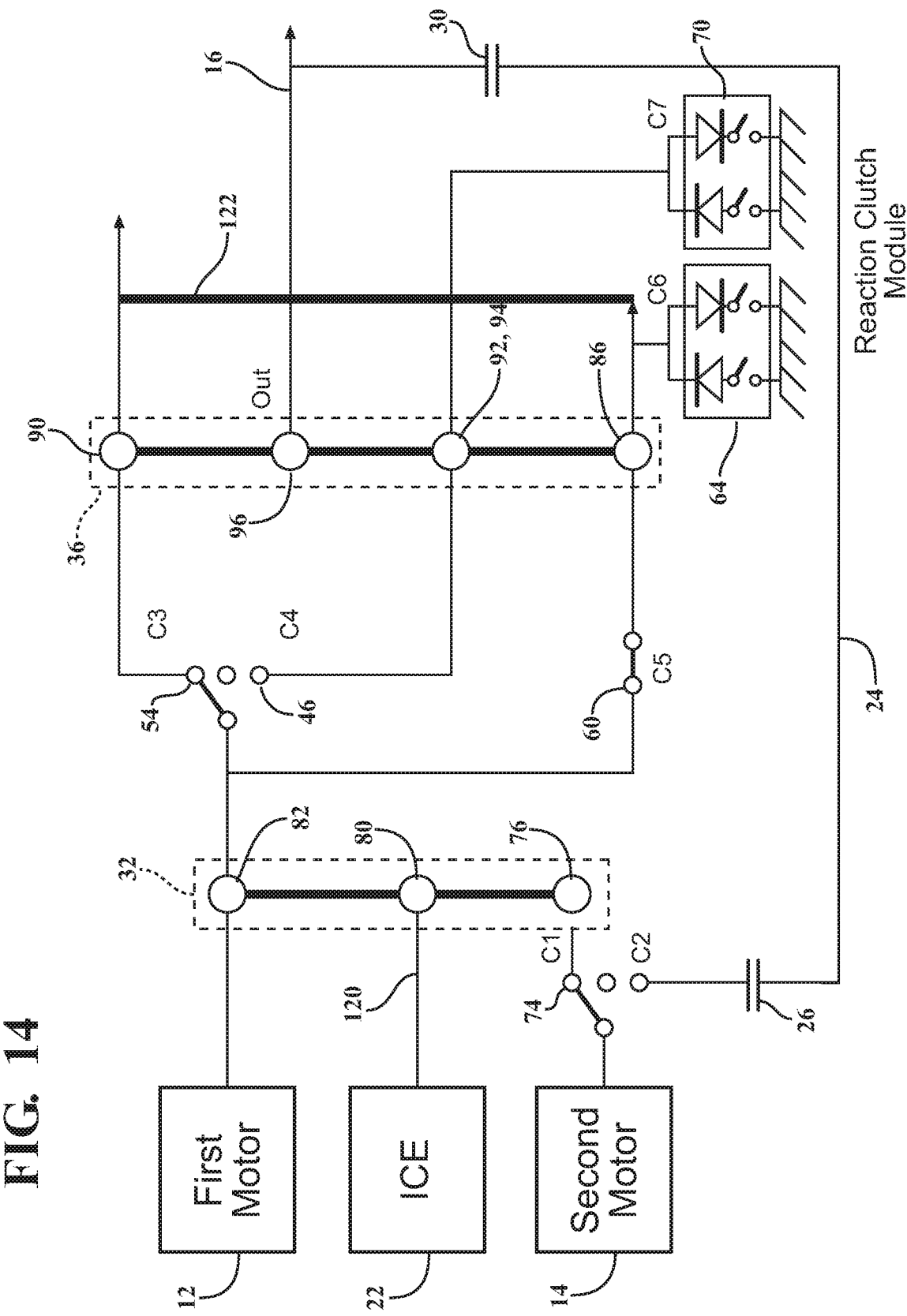
Figure 15:
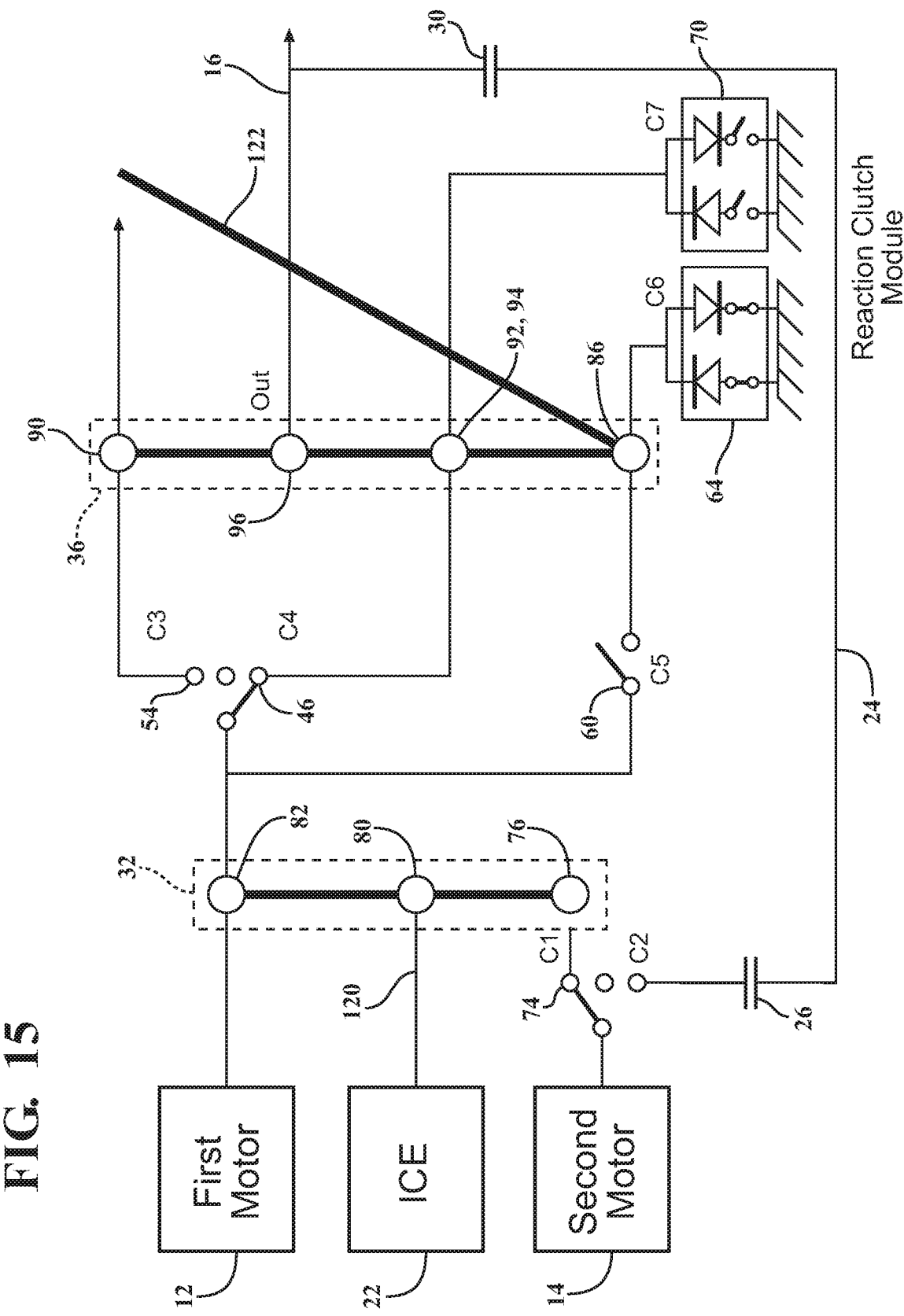
Figure 16:
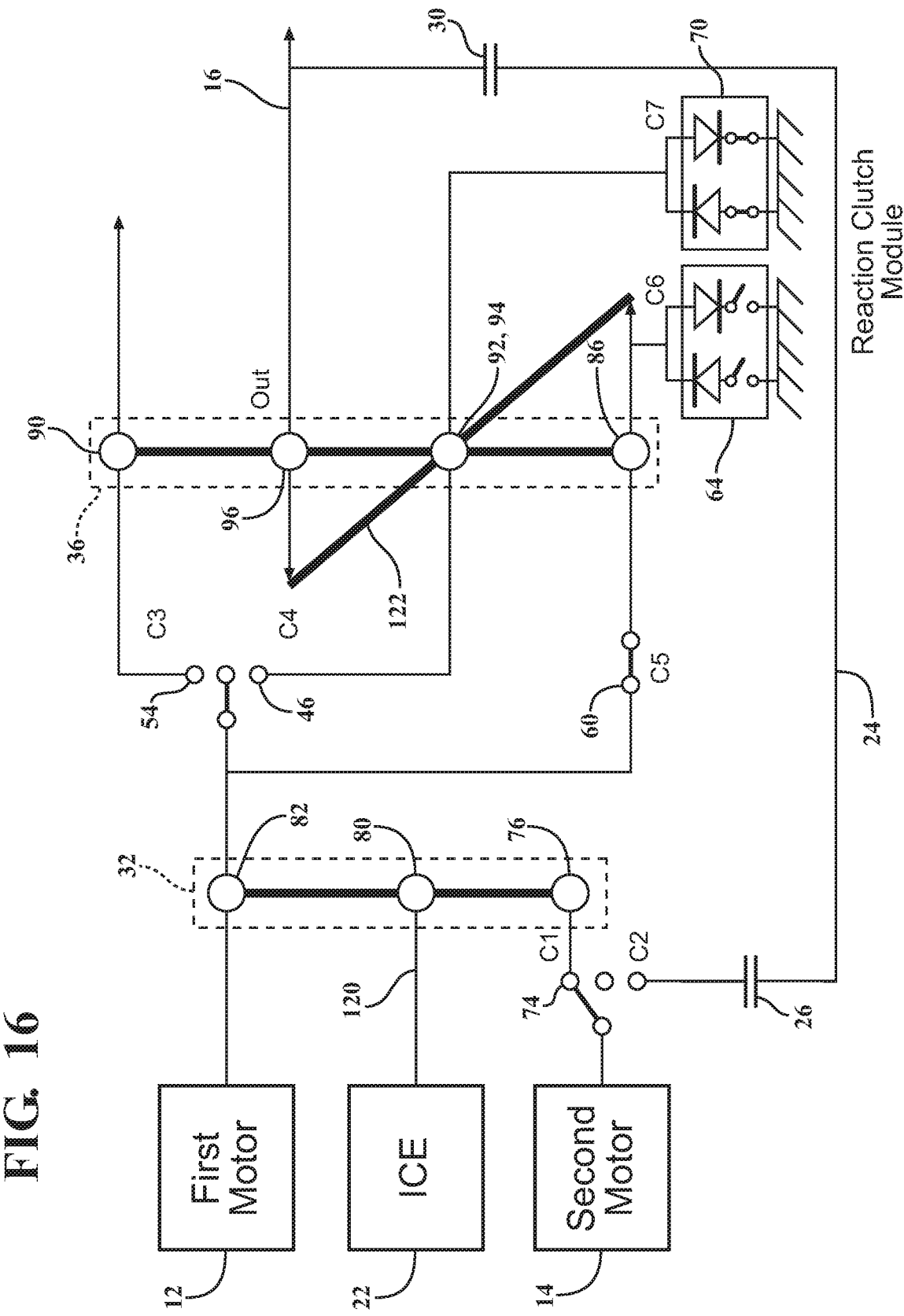

Referring to FIGS. 12 through 17, the lever diagram of the powertrain 10 are generally shown in different gear ratios. In FIG. 12, and as discussed above, the powertrain assembly 10 is in the first gear ratio. In FIG. 13, the powertrain assembly 10 is in the second gear ratio. In FIG. 14, the powertrain assembly 10 is in the third gear ratio. In FIG. 15, the powertrain assembly 10 is in the fourth gear ratio. In FIG. 16, the powertrain assembly 10 is in the reverse gear.

Figure 17:
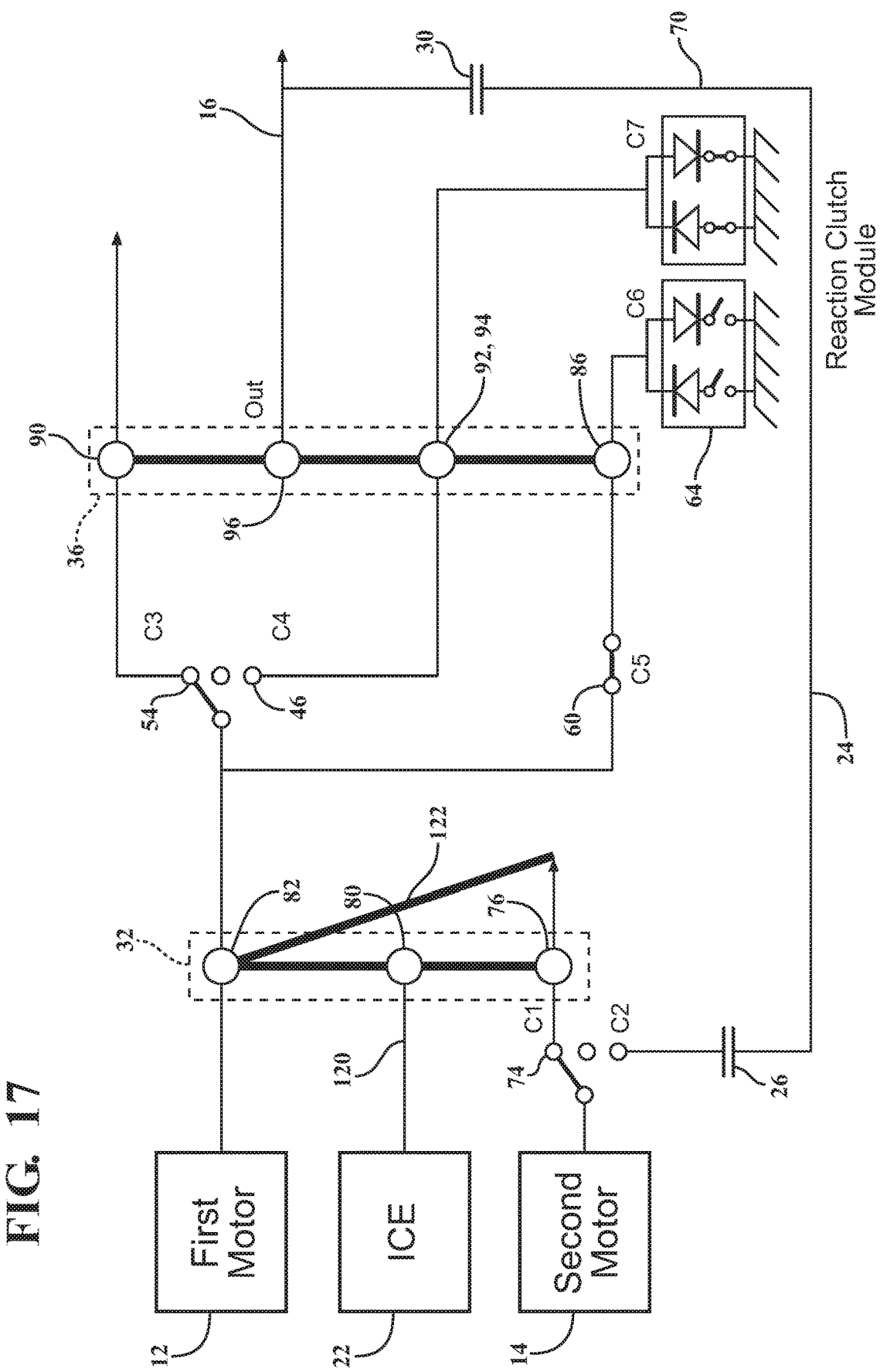

And finally, in FIG. 17, the powertrain assembly 10 is in the static power generation mode. In this mode, the ring gear 82 of the summing subassembly 32 is locked to ground. The third 54 and fifth 60 clutches are linked together to ground. One of the sixth 64 and seventh 70 clutches needs to be closed. Because the seventh clutch 70 is a higher capacity clutch, it is closed in this mode.

All of these changes in gear ratios and modes are completed using the method described in FIGS. 3 through 6 with regard to the shift from the first gear ratio to the second gear ratio.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A powertrain assembly for a vehicle, said powertrain assembly comprising:
   a first motor having a first output;
   a second motor having a second output;
   a summing subassembly connected to said first and second motors, said summing subassembly selectively receiving power output from said first motor and said second motor, wherein said summing subassembly defines a plurality of modes of operation to provide torque from said first and second outputs;
   a gearset connected to said summing subassembly to receive said torque therefrom, said gearset having a plurality of gears and defining an output power shaft whereby said output power shaft outputs a final torque output based on said gear in operation;
   a bypass power shaft operatively connected between said second motor and said output power shaft, such that said second motor provides torque to said output power shaft using said bypass power shaft to reduce torque interruptions created by said summing subassembly during changes in the plurality of modes of operation; and
   a bypass clutch module between said second motor and said bypass power shaft to selectively drive said bypass power shaft when the torque interruption needs to be reduced.

2. A powertrain assembly as set forth in claim 1 including an internal combustion engine operatively connected to said summing subassembly in parallel with said first and second motors.

3. A powertrain assembly as set forth in claim 1 wherein said bypass clutch module includes a first clutch disposed between said second motor and said summing subassembly.

4. A powertrain assembly as set forth in claim 3 wherein said bypass clutch module assembly includes a second clutch disposed between said second motor and said bypass power shaft.

5. A powertrain assembly as set forth in claim 1 wherein said summing subassembly includes a sun gear, a planetary gearset and a ring gear.

6. A powertrain assembly as set forth in claim 5 wherein said sun gear is connectable with said second motor.

7. A powertrain assembly as set forth in claim 6 wherein said ring gear is connectable with said first motor.

8. A method for reducing the size of torque interruptions while shifting a transmission of a vehicle driven by first and second motors, each operatively connected to an output power shaft, the method comprising the steps of:
   increasing torque generated by the first motor;
   decreasing torque generated by the second motor simultaneously with the step of increasing torques generated by the first motor;
   switching the output of the second motor from the output power shaft to a bypass shaft;
   increasing torque generated by the second motor so that the bypass shaft matches the output power shaft;
   disengaging the first force motor from the output power shaft allowing the second motor to drive the output power shaft using the bypass shaft;
   decreasing torque in the first force motor;
   changing gears being driven by the first motor;
   increasing torque in the first force motor;
   disengaging the second motor form the bypass shaft; and
   reengaging the first motor with the output force shaft.

9. A method as set forth in claim 8 including the step of operatively engaging the second motor to the output force shaft in a power splitting arrangement with the first motor.

* * * * *